United States Patent
Light et al.

(10) Patent No.: US 6,393,350 B1
(45) Date of Patent: May 21, 2002

(54) POWERTRAIN CONTROLLER USING A FEED-FORWARD TORQUE CALCULATION

(75) Inventors: Dennis Allen Light, Monroe; Michael John Cullen, Northville; Richard John Hippley, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,261

(22) Filed: Aug. 10, 2001

(51) Int. Cl.[7] .............................................. F16H 59/70
(52) U.S. Cl. .............................. 701/54; 701/51; 477/62
(58) Field of Search .............................. 701/54, 51, 53; 180/336; 477/69, 146, 62, 149, 15, 34, 70, 145, 97, 906

(56) References Cited

U.S. PATENT DOCUMENTS

| | | | |
|---|---|---|---|
| 5,383,825 A | * | 1/1995 | El-Khoury et al. ......... 477/149 |
| 5,413,539 A | | 5/1995 | Leonard et al. ............... 475/63 |
| 5,642,283 A | * | 6/1997 | Schulz et al. ................. 701/51 |
| 6,122,583 A | | 9/2000 | Kirchhoffer et al. .......... 701/51 |
| 6,171,211 B1 | | 1/2001 | Ortmann et al. .............. 477/62 |

* cited by examiner

Primary Examiner—William A. Cuchlinski, Jr.
Assistant Examiner—Marthe Y. Marc-Coleman
(74) Attorney, Agent, or Firm—Carlos Hanze

(57) ABSTRACT

A powertrain controller and a method for calculating feed-forward torque for use by the controller, including a powertrain control module that calculates current and leading indicators of engine torque. The leading indicator of engine torque is used by a multiple-ratio transmission in the powertrain to control transmission line pressure for actuating pressure-operated clutches and brakes for the gearing. The same information that is used for establishing transmission line pressure control is used for commanding an electronic throttle actuator for the engine. The electronic throttle actuator responds to an engine torque request generated by the powertrain controller to achieve a relatively instantaneous response of the engine throttle to a driver command for engine torque.

6 Claims, 3 Drawing Sheets

POWERTRAIN CONTROLLER USING A FEED-FORWARD TORQUE CALCULATION

BACKGROUND OF INVENTION

1. Field of the Invention

The invention relates to a powertrain control system for controlling line pressure for an automatic transmission and for controlling the throttle position of a throttle-controlled engine using a feed-forward torque calculation.

2. Background Art

Contemporary vehicle powertrains include a throttle-controlled engine and multiple-ratio gearing in which the torque flow paths are controlled by fluid pressure-operated friction clutches and brakes. The management of the torque distribution through the gearing from the engine to a transmission-driven shaft is achieved by an electronic controller that responds to powertrain variables, including engine variables and driver commands.

The transmission typically includes a fluid pressure circuit with a solenoid valve for achieving a desired circuit pressure for fluid pressure-operated actuators for the clutches and brakes. In this way, ratio upshifts and downshifts are achieved in response to the powertrain variables.

The engine typically would include a driver-operated throttle valve connected mechanically to a driver-controlled accelerator pedal. Control systems of this kind may be seen by referring to U.S. Patent Nos. 6,171,211, 6,122,583 and 5,413,539. These patents, which illustrate the use of a controller having a throttle position sensor or a mass air flow sensor to quantify the engine torque demand, are assigned to the assignee of the present invention.

Vehicles that are equipped with an electronic throttle control system do not have a direct mechanical linkage between the accelerator pedal and the engine throttle. In such control systems, the driver demand for engine torque is generated by an electronic accelerator pedal assembly, which in turn generates a throttle angle command used by an electronic throttle actuator for the engine. A control system using an electronic throttle valve controller may be seen by referring to U.S. patent application Ser. No. 09/783,116, filed Feb. 14, 2001, entitled "Automatic Transmission Shift Control", Attorney Docket No. FMC 1267 PUS. This application is assigned to the assignee of the present invention.

Engine torque is controlled by the system disclosed in the co-pending patent application to achieve a smooth torque transition during a ratio change and to reduce variations in shift quality from one shift to the next. The controller establishes a commanded ratio rate during a shift interval and compares it to the actual ratio rate to detect an error. The commanded engine torque is then established to reduce the error in a closed-loop fashion. The engine throttle position in the design of the co-pending application is achieved by an engine controller that responds to a commanded throttle position signal, in addition to spark control or fuel control, to achieve an output engine torque. The torque distributed to the transmission is managed by clutch and brake solenoids in a control circuit that is independent of the closed-loop control for achieving a commanded engine output torque.

Accurate control of the transmission control pressure for the pressure-operated clutches and brakes is necessary to avoid excess slippage at the clutches and brakes. Excess slippage would result in excessive clutch and brake wear. On the other hand, pressures that are too high create excessive parasitic pump losses in the transmission, which results in less than optimum fuel efficiency.

For optimal operation, the control pressure in the transmission should be scheduled as a function of engine torque. Since there are time lags associated with the pressure control, a leading indicator of engine torque is needed. This will make it possible for the transmission to respond very quickly to any changes in engine torque commanded by the operator before the change in engine torque actually happens.

In conventional transmissions, an instantaneous correlation between a command for engine torque and the actual development of the desired engine torque is difficult to accurately achieve using a mass air flow sensor as an indicator of torque demand. An air flow sensor detects changes in the amount of air induced into the engine only after the throttle has moved.

Since it is difficult with known control systems to anticipate engine torque changes adequately in advance, control pressure in the transmission is scheduled at an artificially high level in order to ensure that an adequate pressure margin is available for all operating conditions of the powertrain. This margin will prevent unwanted clutch and brake slippage if the torque requirements change more rapidly than the line pressure control can accommodate, but there is a resulting efficiency penalty. The more advanced an indicator of engine torque is, the less the margin must be.

SUMMARY OF INVENTION

It is an objective of the invention to provide a powertrain controller that uses a leading indicator of engine torque. This is obtained by a torque-based electronic throttle control system. The driver request for torque from an electronic accelerator pedal assembly is used to generate an engine torque request, which in turn is fed forward and used to generate a throttle angle for the engine. In the alternative, a driver request can be obtained using a vehicle speed control system if the powertrain uses a vehicle speed controller. The leading indicator of torque is used by a transmission control pressure controller for a multiple-ratio transmission to obtain the earliest possible indication of torque. The torque request is developed directly by the driver's input at the accelerator pedal and not from the resulting movement of the engine throttle.

In an embodiment of the invention, the vehicle operator controls an electronic accelerator pedal to measure the operator's request for engine torque, and an electronic throttle actuator controls engine throttle position. The controller includes a processor unit with stored algorithms for computing the leading indicator of torque as a function of pedal position.

The electronic throttle actuator communicates with the controller whereby the leading indicator of torque is distributed to the throttle actuator to effect a fast change of engine throttle position in response to a torque request.

The electronic powertrain controller includes a transmission control module for controlling fluid pressure in transmission clutches and brakes. The leading indicator of torque is distributed to the transmission control module whereby the pressure at the transmission clutches and brakes is maintained at an optimum level for smooth ratio change and improved transmission operating efficiency.

DETAILED DESCRIPTION

Figure 1:
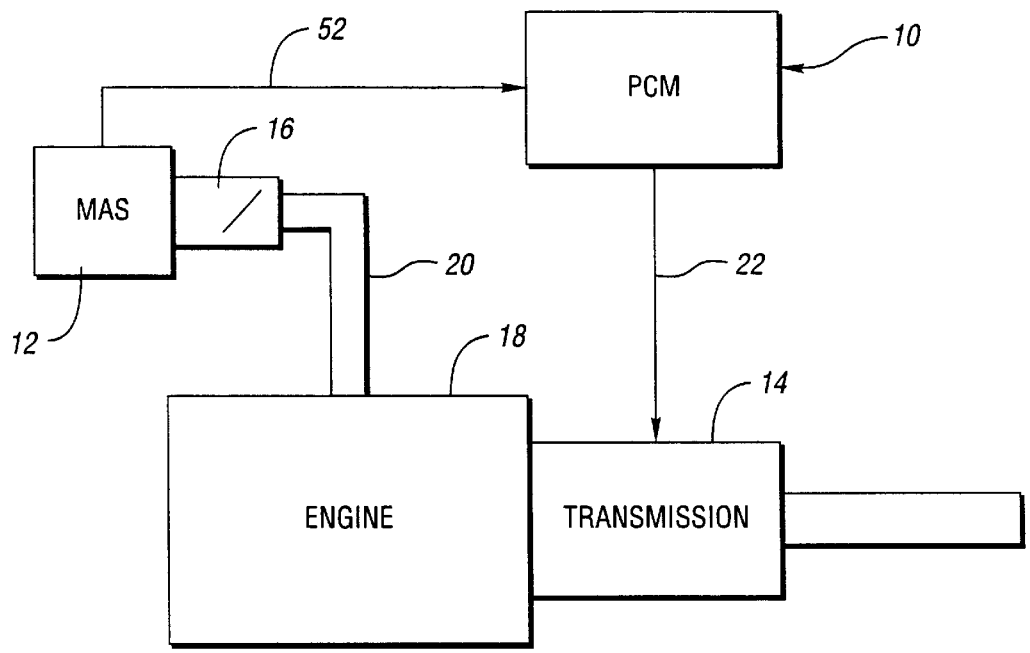
FIG. 1 shows a schematic block diagram of a prior art control system wherein the mass air flow sensor provides current air flow information to the transmission control module, which in turn calculates both current and leading indicators of engine torque for the transmission.

A known transmission and engine control system for a vehicle powertrain is shown in FIG. 1. A powertrain control module 1 0 receives a signal from a mass air flow sensor 12. The air flow information is used by the powertrain control module 10 to calculate current and leading indicators of engine torque. The leading indicator of engine torque is used by the transmission shown by block 12, which includes a transmission line pressure control that responds to control logic to regulate line pressure.

In some prior art systems, a throttle position sensor is used to calculate air flow instead of measuring air flow directly from a mass air flow sensor. Regardless of whether a mass air flow sensor is used or a throttle position sensor is used, the signal that is developed is effective only after the throttle has moved.

The engine throttle is schematically represented in FIG. 1 by block 16. The engine is represented by block 18. The intake manifold for the engine 18 is shown at 20. The leading indicator of torque is distributed to the transmission line pressure control logic through signal flow path 22.

Figure 2:
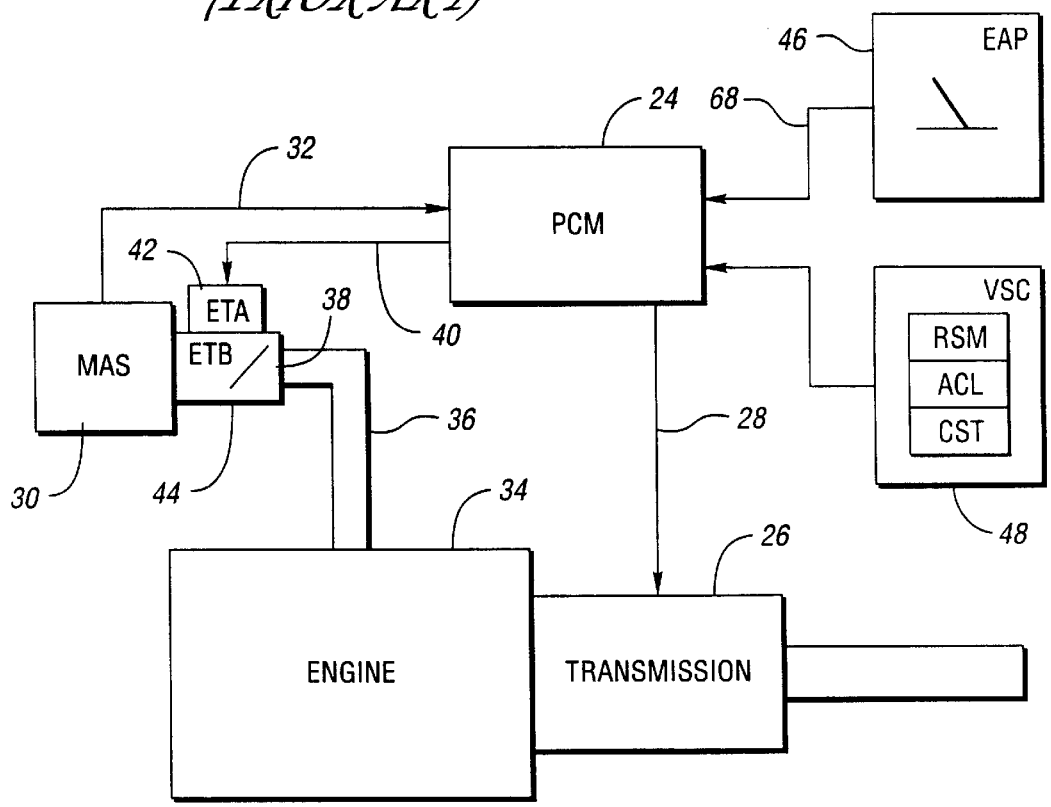
FIG. 2 is a schematic block diagram showing the system of the present invention where a driver demand request for torque is directed to the electronic powertrain control module, which develops an engine torque request for use by the electronic throttle actuator for the engine as well as by the transmission pressure controller for the clutches and brakes.

The control system of the present invention is schematically illustrated in block diagram form in FIG. 2. The powertrain control module 24 distributes a leading indicator of torque to the transmission 26 through a signal flow path 28. A mass air flow sensor 30 distributes current air flow information to the powertrain control module 24 through signal flow path 32. The engine 34 has an intake manifold communicating with the electronic throttle body 38.

The driver request for engine torque is distributed to the transmission through signal flow path 28, as mentioned previously. It is distributed also to signal flow path 40 to command the electronic throttle actuator 42, which is mounted on the electronic throttle body 44 to open and close the engine throttle.

The powertrain control module may contain both engine control algorithms and transmission control algorithms. It is possible, however, that the integrated powertrain control module shown in FIG. 2 can be replaced by separate engine controls and transmission controls, together with an external communication network between them.

The driver request for engine torque is communicated to the powertrain control module by an electronic throttle actuator (accelerator pedal) shown at 46. In the alternative, vehicle speed control mechanism 48 can be used to communicate a driver request for engine torque to the powertrain control module.

Figure 3:
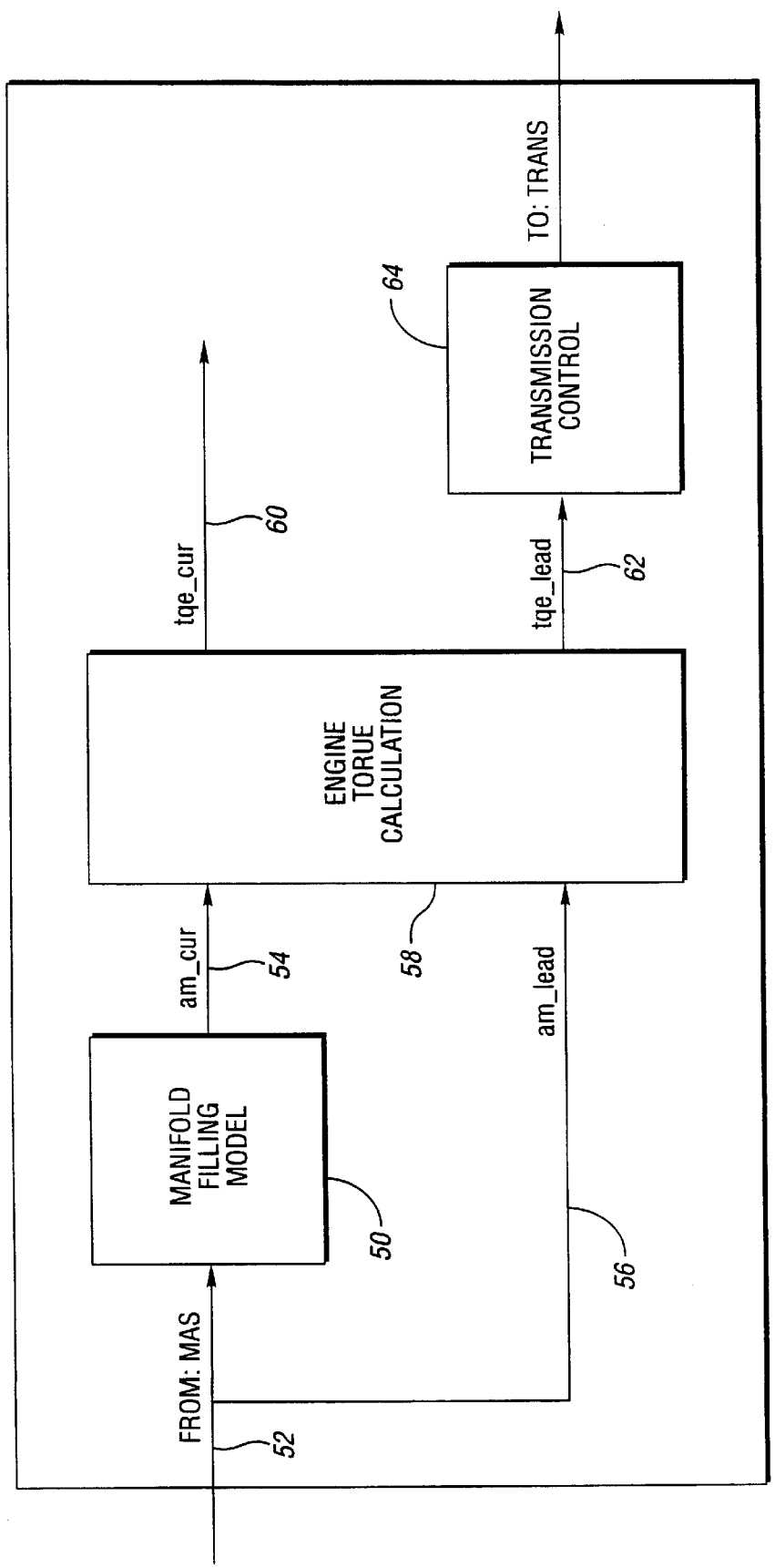
FIG. 3 shows a prior art control system wherein the air flow is used to calculate a torque input signal for a transmission controller.

A powertrain control module for known control systems is shown in block diagram form in FIG. 3. An air flow signal from a mass air flow sensor is distributed to a manifold filling model portion 50 of the powertrain control module 10, as shown at 52. This generates a current air mass flow indication at the cylinders, as shown at 54 (am_cur). This value, along with the input received directly from the sensor without going through the model portion 50, is directed, as shown at 56, to the engine torque calculation logic 58. This logic generates both current and leading indicators of engine torque; namely, tqu_cur and tqe_lead, as shown at 60 and 62, respectively. The leading indicator of torque is used by the transmission control to control line pressure. The transmission control is shown at 64. The current torque indicator (tqe_cur) at 60 can be used also for any other feature of the driveline system that requires it, such as traction control for the vehicle wheels.

Figure 4:
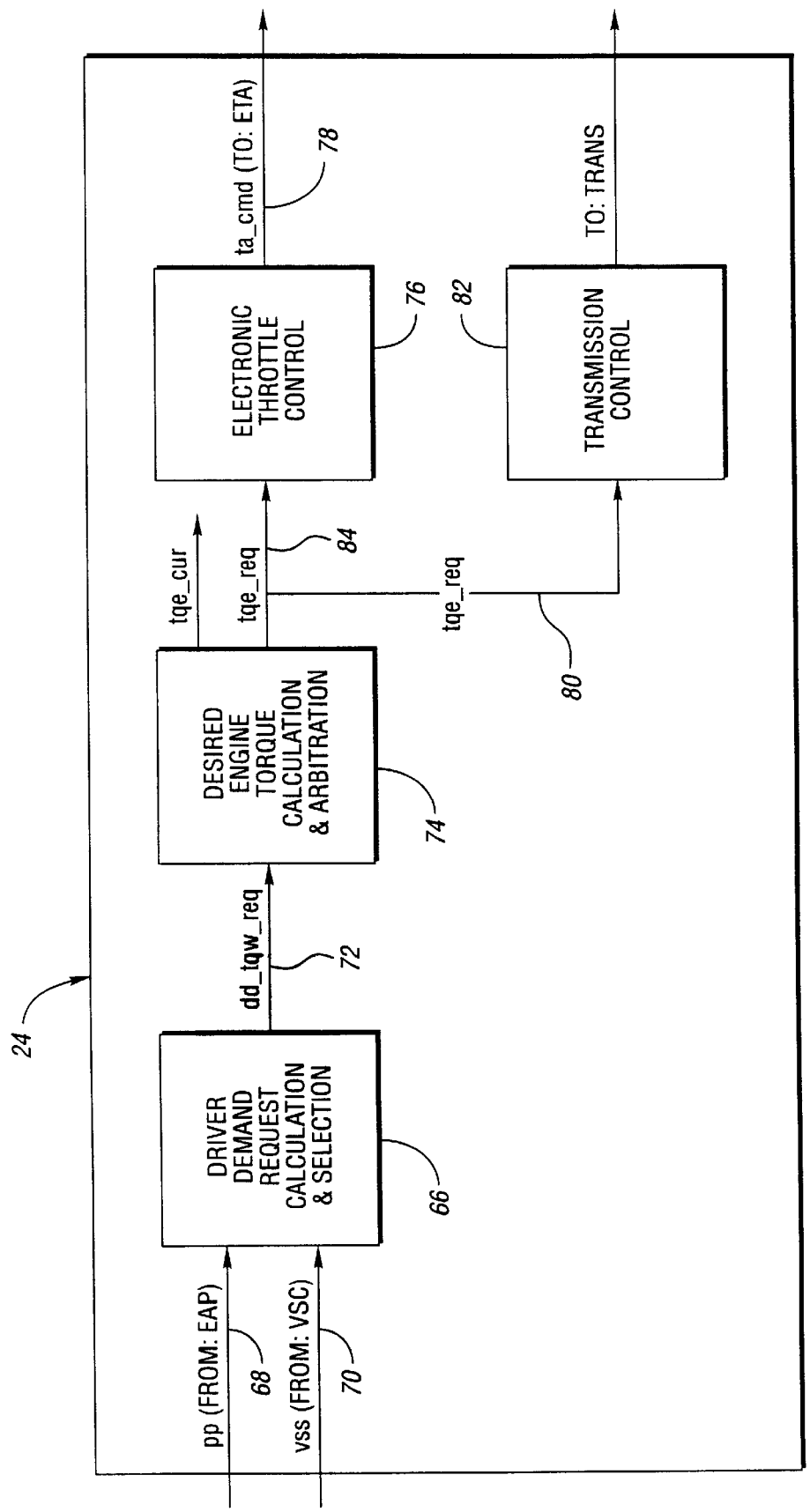
FIG. 4 is another schematic block diagram of the system of the present invention where the electronic accelerator pedal signal and the vehicle speed signal are used to calculate both a throttle angle command and an input to the transmission pressure controller for the clutches and brakes.

The powertrain control module of the present invention is shown in block diagram form in FIG. 4. Input from the electronic accelerator pedal sensor is delivered to a driver demand request calculation and selection block 66. This block receives the electronic accelerator pedal signal from the electronic accelerator pedal 46 through signal flow path 68. If the vehicle has a vehicle speed control, the driver demand request for torque is received through signal flow path 70. The driver demand request calculation and selection block 66 generates a current value of driver demand in the form of a wheel torque request (dd_tqw_req), as shown at 72. This value is converted into an engine torque request (tqe_req) by the desired engine torque calculation and arbitration logic shown at control block 74. This logic is converted by the electronic throttle control logic in control block 76 to produce a throttle angle command (ta_cmd), as shown at 78. This signal is delivered to the electronic throttle actuator 42.

The desired engine torque calculation and arbitration logic also uses the wheel torque request at 72 to generate a leading indicator of engine torque (tqu_lead), as shown at 80. This is used by the transmission control 82.

As in the case of the known system of FIG. 3, for the desired engine torque calculation and arbitration control 74, mass air flow information is used to calculate the current indicator of engine torque (tqu_cur) for other subsystems of the vehicle that require that information, such as vehicle traction control.

In the system of FIG. 4, driver demand is first expressed as a vehicle acceleration request.

For the electronic accelerator pedal 46, the vehicle acceleration request is a function of pedal position and vehicle speed. In the case of a vehicle speed control input, as shown at 70 in FIG. 4, the vehicle acceleration request is a function of vehicle speed error (vse), which is the difference between the actual vehicle speed and the vehicle speed control set speed (vss). These relationships are expressed algebraically as follows:

var_eap=f(pp, vs);

vse=vs−vss;

var_vsc=f(vse).

The control routine then makes a selection of the vehicle acceleration request to use as the overall driver demand acceleration request (dd_var). This selection is based on whether the vehicle speed control currently is engaged and active and if it is being overridden by the accelerator pedal. These conditions are expressed algebraically as follows:

if(VSC is not active OR (pedal is depressed AND var_eap∃var_vsc))

then dd_var=var_eap;

else dd_var=var_vsc;

end if.

Driver demand now is expressed as a wheel torque request, as indicated at 72 in FIG. 4 (dd_tqw_req). The driver demand, now expressed as a wheel torque request (dd_ter), is calculated as a function of vehicle characteristics such as vehicle mass (veh_mass) and vehicle running loss (run_loss). Vehicle running loss is calculated by a second degree polynomial using vehicle empirical coastdown characteristics (A, B and C) as a function of vehicle speed versus wheel torque. It is related to tractive effort by the driving wheel effective tire diameter (tire_diam). These relationships are expressed in the following algebraic equations:

run_loss=A+B*vs+C*vs$^2$ dd_ter=K1*veh_mass*dd_var+run_loss dd_tqw_req=k2*dd_ter*tire_diam;

where K1 and k2 are appropriate unit conversion factors.

The driver demanded wheel torque request is calculated and arbitrated at 74 of FIG. 4, as previously explained. It is arbitrated with other potential torque reduction source requests to produce a final wheel torque request (tq_req). This is done by selecting the minimum of all requests. These sources can be, for example, traction control and vehicle speed limiting control. This arbitration is expressed algebraically as follows:

tqw_req=min(dd_tqw_req, tc_tqw_req, vslim_tqw_req).

The wheel torque then is converted to a desired output shaft torque request (tqo_req) as a function of final drive ratio (fdr) and final drive running losses (fd_loss). The final drive running loss is a function of output shaft speed (oss). If the vehicle has a four-wheel drive transfer case, with a 4×4 low gear between the final drive and the transmission, another intermediate conversion must be made if the low gear is engaged.

The calculation of the output shaft torque request is expressed algebraically as follows:

fd_loss=f(oss);

tqo_req=tqw=req/fdr+fd_loss.

The output shaft torque is converted to a preliminary engine torque (tqe_req_pre) as a function of the transmission gear ratio (rt_gear), torque converter multiplication (rt_conv) and transmission running losses (trans_loss). Transmission running loss may be modeled with several inputs. The computation of the preliminary engine torque request is expressed algebraically as follows:

tqe_req_pre=tqo_req/(rt_gear*rt_conv)+trans_loss.

If there are other engine torque reduction requesters, further arbitration can be done at this point. The final engine torque request (tqe_req) is shown at 84. This is computed in a manner similar to the computation of wheel torque. These torque sources could be engine speed limiting, transmission torque limiting or shift modulation, for example. Computation of the engine torque request is expressed algebraically as follows:

tge_req_arb=min(tqe_req_pre, rpmlim_tqe_req, translim_tqe_req, transmod_tqe_req).

The final engine torque request is also the leading indicator of engine torque shown at 84.

It is distributed to the transmission control 82 as previously indicated.

The engine torque request is converted at 76 to a desired air mass (des_am). This is a simple function of engine speed (n) and engine losses from friction and other parasitic loss elements (tqe_loss). The desired air mass is expressed algebraically as follows:

des_am=f(tqe_req_arb+tqe_loss, n).

After compensating this air mass request for air charged temperature, barometric pressure and exhaust gas recirculation factors, a throttle body mapping function can be used to generate the throttle angle command (ta_cmd) as shown at 78. Compensation for temperature and barometric pressure is the inverse of how the throttle body map would be corrected. This is expressed algebraically as follows:

des_am_stp=(de_sam*29.92/bp)/f(act)+egr_add.

ta_cmd=f(des_am_stp, n).

Although an embodiment of the invention has been disclosed, it will be apparent to persons skilled in the art that modifications may be made without departing from the scope of the invention. All such modifications and equivalents thereof are intended to be included within the scope of the following claims.

What is claimed is:

1. A control system for an automotive vehicle powertrain comprising a throttle-controlled engine and a multiple-ratio automatic transmission, the transmission having multiple-ratio gearing and fluid pressure-operated clutches and brakes for establishing and disestablishing plural torque flow paths through the gearing;

an electronic accelerator pedal under the control of a vehicle operator for measuring an operator request for engine torque;

an electronic throttle actuator for controlling engine throttle position;

an electronic powertrain controller including a processor unit with stored algorithms for computing a leading indicator of engine torque as a function of electronic accelerator pedal position;

the electronic throttle actuator communicating with the powertrain controller whereby the leading indicator of engine torque is distributed to the electronic throttle actuator to effect a fast change of engine throttle position in response to a request for engine torque;

the electronic powertrain controller including a transmission control module for controlling fluid pressure for the transmission clutches and brakes, the leading indicator of engine torque computed by the powertrain controller being distributed to the transmission control module whereby the pressure for the transmission clutches and brakes is maintained at an optimum level for smooth ratio changes and improved transmission operating efficiency.

2. The control system set forth in claim 1 wherein the powertrain controller has at least one other control module in addition to the transmission control module, including a vehicle traction control module, for developing a demand for engine torque.

3. The control system set forth in claim 1 wherein the powertrain controller includes at least one other control module in addition to the transmission control module, including a vehicle speed limiting module, for developing a demand for engine torque.

4. A control system for an automotive vehicle powertrain comprising a throttle-controlled engine and a multiple-ratio automatic transmission, the transmission having multiple ratio gearing and fluid pressure-operated clutches and brakes for establishing and disestablishing plural torque flow paths through the gearing;

the engine having power cylinders and an air intake manifold for supplying air to the power cylinders;

a mass air flow sensor communicating with the air intake manifold for measuring mass intake air flow to the power cylinder;

an electronic accelerator pedal under the control of a vehicle operator for measuring an operator request for engine torque;

an electronic throttle actuator for controlling engine throttle position;

an electronic powertrain controller including a processor unit with stored algorithms for computing a leading indicator of engine torque as a function of electronic accelerator pedal position and measured mass intake air flow;

the electronic throttle actuator communicating with the powertrain controller whereby the leading indicator of engine torque is distributed to the electronic throttle actuator to effect a fast change of engine throttle position in response to a request for engine torque;

the electronic powertrain controller including a transmission control module for controlling fluid pressure for the transmission clutches and brakes, the leading indicator of engine torque computed by the powertrain controller being distributed to the transmission control module whereby the pressure for the transmission clutches and brakes is maintained at an optimum level for smooth ratio changes and improved transmission operating efficiency.

5. A control system for an automotive vehicle powertrain comprising a throttle-controlled engine, an automotive vehicle speed control for providing an operator request for vehicle acceleration as a function of a difference between actual vehicle speed and a set vehicle speed control speed, and a multiple-ratio automatic transmission, the transmission having multiple-ratio gearing and fluid pressure-operated clutches and brakes for establishing and disestablishing plural torque flow paths through the gearing;

an electronic throttle actuator for controlling engine throttle position;

an electronic powertrain controller including processor unit with stored algorithms for computing a leading indicator of engine torque as a function of the operator request for vehicle acceleration;

the electronic throttle actuator communicating with the powertrain controller whereby the leading indicator of engine torque is distributed to the electronic throttle actuator to effect a fast change of engine throttle position in response to a request for vehicle acceleration;

the electronic powertrain controller including a transmission control module for controlling fluid pressure for the transmission clutches and brakes, the leading indicator of engine torque computed by the powertrain controller being distributed to the transmission control module whereby the pressure for the transmission clutches and brakes is maintained at an optimum level for smooth ratio changes and improved transmission operating efficiency.

6. A control system for an automotive vehicle powertrain comprising a throttle-controlled engine, an automatic vehicle speed control for providing a request for vehicle acceleration as a function of a difference between actual vehicle speed and a set vehicle speed control speed, and a multiple-ratio automatic transmission, the transmission having multiple-ratio gearing and fluid pressure-operated clutches and brakes for establishing and disestablishing plural torque flow paths through the gearing;

the engine having power cylinders and an air intake manifold for supplying air to the power cylinders;

a mass air flow sensor communicating with the air intake manifold for measuring mass intake air flow to the power cylinders;

an electronic throttle actuator for controlling engine throttle position;

an electronic powertrain controller including a processor unit with stored algorithms for computing a leading indicator of engine torque as a function of a request for vehicle acceleration and measured mass intake air flow;

the electronic throttle actuator communicating with the powertrain controller whereby the leading indicator of engine torque is distributed to the electronic throttle actuator to effect a fast change of engine throttle position in response to a request for vehicle acceleration;

the electronic powertrain controller including a transmission control module for controlling fluid pressure for the transmission clutches and brakes, the leading indicator of engine torque computed by the powertrain controller being distributed to the transmission control module whereby the pressure for the transmission clutches and brakes is maintained at an optimum level for smooth ratio changes and improved transmission operating efficiency.

* * * * *